May 17, 1960 H. A. PERKINS, JR 2,937,287
OSCILLATOR CIRCUIT
Filed Jan. 10, 1958
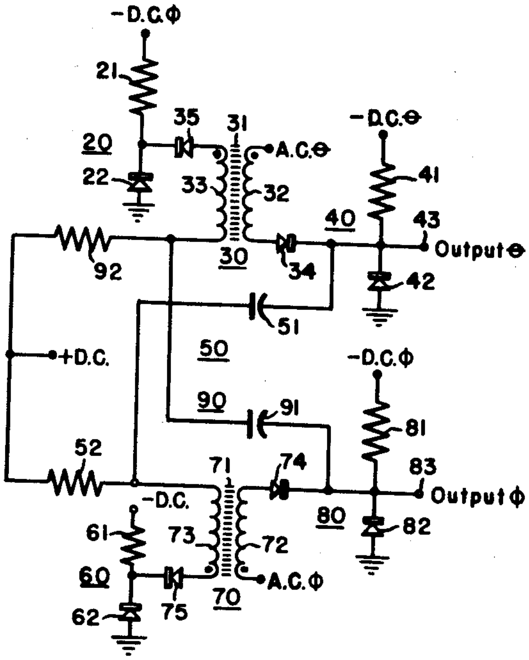
WITNESSES
John E. Heasley Jr.
Myron E. Click
INVENTOR
Harley A. Perkins, Jr.
BY F. E. Browder
ATTORNEY United States Patent Office 2,937,287

Patented May 17, 1960

2,937,287

OSCILLATOR CIRCUIT

Harley A. Perkins, Jr., Baldwin Township, Allegheny County, Pa., assignor to Westinghouse Electric Corporation, East Pittsburgh, Pa., a corporation of Pennsylvania Application January 10, 1958, Serial No. 708,220

8 Claims. (Cl. 307—88)

This invention relates to oscillator circuits in general and in particular to magnetic amplifier relaxation oscillators.

There are many applications where a device is required which will produce an output which charges periodically from some maximum value to zero. Annunciator circuits in particular require such a device for flashing an alarm light. Such devices in the past have performed well for the function for which they were intended, however, most of said devices had difficulty in terms of long-time reliability, general ruggedness and lack of maintenance-free operation.

It is an object of this invention to provide an improved oscillator circuit.

It is another object of this invention to provide an improved oscillator circuit having the inherent qualities of ruggedness, long life and maintenance-free operation.

It is still another object of this invention to provide an improved oscillator circuit utilizing a two-core magnetic amplifier in supplying an output which charges periodically from some maximum predetermined value to zero, said magnetic amplifier supplying the requisite output variation over a wide range of power supply voltage and with a minimum of components.

Further objects of this invention will become apparent from the following description when taken in conjunction with the accompanying drawing.

In said drawing, for illustrative purposes only, there is shown a preferred embodiment of the invention. In said drawing the manner in which the windings have been wound upon their associated saturable magnetic cores is indicated by the polarity dot convention. That is, current flowing into the polarity dot end of the winding will drive the associated core toward positive saturation. Current flowing out of the polarity dot end of the winding will drive the associated core away from positive saturation.

In the drawing the magnetic amplifier circuit embodying the teachings of this invention comprises in general a pair of magnetic amplifiers 30 and 70, a pair of coupling circuits 50 and 90 and associated non-linear circuits 20, 40, 60 and 80.

The magnetic amplifier 30 comprises a saturable magnetic core 31 having inductively disposed thereon an output winding 32 and a reset or input winding 33. The output winding 32 is serially connected between a power supply of alternating-current voltage of the $\theta$ phase and a rectifying means 34 which is connected to an output terminal 43. A non-linear circuit 40, which comprises a resistor 41 and a rectifier 42, is connected between a source of negative direct-current of the $\theta$ phase and ground. The junction of the resistor 41 and the rectifier 42 is connected to the output terminal 43. One lead of the reset winding 33 is connected through a rectifier 35 to the junction of a resistor 21 and a rectifier 22 which comprises the non-linear circuit 20. The non-linear circuit 20 is connected between a source of negative direct-current of the $\phi$ phase and ground.

The magnetic amplifier 70 comprises a saturable magnetic core member 71 having inductively disposed thereon an output winding 72 and a reset or input winding 73. The output winding 72 is serially connected with a rectifying means 74 between a power supply of alternating current voltage of the $\phi$ phase and an output terminal 83. The non-linear circuit 80, which comprises a resistor 81 and a rectifying means 82, is connected between a source of negative direct-current of the $\phi$ phase and ground. One lead of the reset winding 73 is connected through a rectifying means 75 to the junction of a resistor 61 and a rectifier 62 which comprises the non-linear circuit 60. The non-linear circuit 60 is connected between a source of negative direct-current of the $\theta$ phase and ground.

The coupling circuit 50 comprises a capacitive means 51 and a resistor means 52 serially connected between the output terminal 43 and a source of positive direct-current. The other lead of the reset winding 73 is connected to the junction of the capacitor means 51 and the resistor 52. The coupling circuit 90 comprises a capacitor 91 and a resistor 92 serially connected between the output terminal 83 and a source of positive direct-current. The other lead of the reset winding 33 is connected to the junction of the capacitor 91 and the resistor 92.

The power supplies of both magnetic amplifiers are of the same frequency and 180° out of phase and are of such magnitude to drive the respective cores 31 and 71 just to positive saturation during one half-cycle. The resetting voltage applied to the cores 31 and 71 by the coupling circuits 90 and 50 is such to drive the cores to negative saturation in a time interval determined by the value of the components of the respective coupling circuits.

The operation of the non-linear circuits is well-known in the art and will not be described in detail herein. It will suffice to say that the use of the non-linear circuits 20, 40, 60 and 80 allows the flow of exciting current in their respective associated windings without allowing overcurrent to be applied to the respective windings.

The magnetic amplifiers 30 and 70 operate in identical fashion in that the ouput windings 32 and 72 gate an output to the terminals 43 and 83, after the cores 31 and 71 have initially been driven to saturation, until a reset voltage is applied to the windings 33 and 73 respectively. Magnetic amplifiers operating in this fashion when used in the logic field have been termed NOT logic elements. That is, the respective magnetic amplifiers always gate an output until an input is received. When a NOT logic element receives an input, the output ceases until said input is removed.

The operation of the oscillator circuit illustrated in the drawing will now be described. Assume that the magnetic amplifier 30 is gating an output from the winding 32 at the terminal 43 of the $\theta$ phase. This output is passed through the coupling circuit 50 to the reset winding of the magnetic amplifier 70, effecting a reset of the magnetic amplifier 70. Thus, the magnetic amplifier 70 will not be gating an output of the $\phi$ phase to the terminal 83. After a predetermined time has elapsed determined by the value of the capacitor 51 and the resistor 52, insufficient voltage will be passed through the capacitor 51 to fully reset the saturable core 71 through the reset winding 73. Since the resistor 52 is tied to a positive direct-current, the capacitor 51 discharges towards the source of direct-current.

Since the magnetic amplifier 70 is not now being fully reset by the output from the magnetic amplifier 30, the magnetic amplifier 70 begins to deliver an output of the $\phi$ phase to the output terminal 83. This $\phi$ output is applied to the reset winding 33 of the magnetic amplifier 30 through the capacitor 91 of the coupling circuit 90, partially resetting the saturable magnetic core 31 toward negative saturation. Therefore, the output of the magnetic amplifier 30 of the $\theta$ phase will be reduced, which in turn will reduce the amount of resetting by the $\theta$ output delivered to the resetting winding 73 of the magnetic amplifier 70. The output of the magnetic amplifier 70 therefore increases, which in turn increases the amount of resetting of the magnetic amplifier 30. This action is cumulative so that the output switches abruptly from the $\theta$ phase to the $\phi$ phase. Eventually after a period of time determined by the value of the capacitor 91 and the resistor 92, the process will reverse and the output will revert abruptly back to the $\theta$ phase.

The rectifiers 35 and 75 function to isolate the reset windings 33 and 73 from the non-linear circuits 20 and 60, respectively. The rectifiers 34 and 74 function to provide self-saturation and unilateral current flow in the windings 32 and 72 of the magnetic amplifiers 30 and 70, respectively.

A relaxation oscillator circuit has been disclosed herein which produces an output which changes periodically from a predetermined maximum output to zero. This function is performed by utilizing components that are inherently rugged, reliable and having a long maintenance-free operation. The magnetic amplifier components utilized herein are not as critical as to specifications as are other magnetic amplifiers. That is, the magnetic core materials, for example, utilized herein do not have to attain the nearly square loop hysteresis characteristic that other magnetic devices depend upon for their operation. The apparatus described herein is easily adjusted. Either output may be held on for a majority or minority of the total operating period by changing the values of the capacitors and resistors of the coupling circuits 50 and 90. The apparatus described herein also operates satisfactorily over a supply of voltage range of more than two to one, making it reliable in the face of large power supply variations.

In conclusion, it is pointed out that while the illustrated example constitutes a practical embodiment of my invention, I do not limit myself to the exact details shown, since modifications of the same may be varied without departing from the spirit and scope of this invention.

I claim as my invention:

1. In an oscillator circuit, in combination; a first NOT logic element; a second NOT logic element; and first and second electric energy storing coupling circuits; the output of said first NOT logic element being connected to the input of said second NOT logic element by said first coupling circuit; the output of said second NOT logic element being connected to the input of said first NOT logic element by said second coupling circuit; said coupling circuits each being operative to store electric energy to a predetermined magnitude before dissipating their electric energy.

2. In an oscillator circuit, in combination; a first NOT logic element; a second NOT logic element; and first and second coupling circuits each comprising capacitive means; the output of said first NOT logic element being connected to the input of said second NOT logic element by said first coupling circuit; the output of said second NOT logic element being connected to the input of said first NOT logic element by said second coupling circuit; said coupling circuits each being operative to charge to a predetermined magnitude before being discharged.

3. In an oscillator circuit, in combination; a first NOT logic element; a second NOT logic element; and first and second coupling circuits each comprising capacitive means; the output of said first NOT logic element being connected to the input of said second NOT logic element by said serially connected capacitive means of said first coupling circuit; the output of said second NOT logic element being connected to the input of said first NOT logic element by said serially connected capacitive means of said second coupling circuit; said coupling circuits each being operative to charge to a predetermined magnitude before being discharged.

4. In an oscillator circuit, in combination; a first NOT logic element; a second NOT logic element; and first and second coupling circuits each comprising capacitive means; the output of said first NOT logic element being connected to the input of said second NOT logic element by said serially connected capacitive means of said first coupling circuit; the output of said second NOT logic element being connected to the input of said first NOT logic element by said serially connected capacitive means of said second coupling circuit; said coupling circuits each being operative to charge to a predetermined magnitude before being discharged; each said capacitive means of each said coupling circuit being connected to drain its charge to a source of direct-current of the proper polarity.

5. In an oscillator circuit, in combination; a first NOT logic element; a second NOT logic element; and first and second coupling circuits each comprising capacitive means; the output of said first NOT logic element being connected to the input of said second NOT logic element by said serially connected capacitive means of said first coupling circuit; the output of said second NOT logic element being connected to the input of said first NOT logic element by said serially connected capacitive means of said second coupling circuit; said coupling circuits each being operative to charge to a predetermined magnitude before being discharged; each said capacitive means of said coupling circuit being connected to drain its charge to a source of direct-current of the proper polarity; each said NOT logic element comprising a saturable magnetic core having inductively disposed thereon an input winding and an output winding.

6. In an oscillator circuit, in combination; a first NOT logic element; a second NOT logic element; and first and second coupling circuits each comprising capacitive means; the output of said first NOT logic element being connected to the input of said second NOT logic element by said serially connected capacitive means of said first coupling circuit; the output of said second NOT logic element being connected to the input of said first NOT logic element by said serially connected capacitive means of said second coupling circuit; said coupling circuits each being operative to charge to a predetermined magnitude before being discharged; each said capacitive means of each said coupling circuit being connected to drain its charge to a source of direct-current of the proper polarity; each said NOT logic element comprising a saturable magnetic core having inductively disposed thereon an input winding and an output winding; said output windings of said first and second NOT logic elements being connected to power supplies of substantially the same frequency.

7. In an oscillator circuit, in combination; a first NOT logic element; a second NOT logic element; and first and second coupling circuits each comprising capacitive means; the output of said first NOT logic element being connected to the input of said second NOT logic element by said serially connected capacitive means of said first coupling circuit; the output of said second NOT logic element being connected to the input of said first NOT logic element by said serially connected capacitive means of said second coupling circuit; said coupling circuits each being operative to charge to a predetermined magnitude before being discharged; each said capacitive means of each said coupling circuit being connected to drain its charge to a source of direct-current of the proper polarity; each said NOT logic element comprising a saturable magnetic core having inductively disposed thereon an input winding and an output winding; said output windings of said first and second NOT logic elements being connected to power supplies of substantially the same frequency; said power supplies being substantially 180° out of phase.

8. In an oscillator circuit, in combinnation; a first NOT logic element; a second NOT logic element; and first and second coupling circuits each comprising capacitive means; the output of said first NOT logic element being connected to the input of said second NOT logic element by said serially connected capacitive means of said first coupling circuit; the output of said second NOT logic element being connected to the input of said first NOT logic element by said serially connected capacitive means of said second coupling circuit; said coupling circuits each being operative to charge to a predetermined magnitude before being discharged; each said capacitive means of said coupling circuit being connected to drain its charge to a source of direct-current of the proper polarity; each said NOT logic element comprising a saturable magnetic core having inductively disposed thereon an input winding and an output winding; said output windings of said first and second NOT logic elements being connected to power supplies of substantially the same frequency; said power supplies being substantially 180° out of phase; each said winding of each said NOT logic winding having a non-linear circuit connected thereto for limiting the amount of current flow therethrough.

References Cited in the file of this patent

UNITED STATES PATENTS

| | | |
|---|---|---|
| 2,695,993 | Haynes | Nov. 30, 1954 |
| 2,747,109 | Montner | May 22, 1956 |
| 2,787,712 | Priebe et al. | Apr. 2, 1957 |